(12) United States Patent
Lang et al.

(10) Patent No.: US 6,406,659 B1
(45) Date of Patent: Jun. 18, 2002

(54) COMPOSITE MOLDING METHOD AND APPARATUS

(76) Inventors: Eric Lang; Rich Rydin, both of 5307 Christiana Meadows, Bear, DE (US) 19701

( * ) Notice: Subject to any disclaimer, the term of this patent is extended or adjusted under 35 U.S.C. 154(b) by 0 days.

(21) Appl. No.: 08/412,539

(22) Filed: Mar. 28, 1995

(51) Int. Cl.[7] .................. B29C 43/12; B29C 43/20; B29C 70/44

(52) U.S. Cl. .............. 264/510; 264/102; 264/257; 264/258; 264/313; 264/314; 264/511; 264/571

(58) Field of Search .............. 264/510, 511, 264/513, 314, 102, 571, 252, 258

(56) References Cited

U.S. PATENT DOCUMENTS

| | | | |
|---|---|---|---|
| 2,739,350 A | * 3/1956 | Lampman | 18/45 |
| 2,913,036 A | 11/1959 | Smith | |
| 2,977,269 A | 3/1961 | Nerwick | |
| 3,382,125 A | 5/1968 | Lowdermilk, Jr. | |
| 3,553,054 A | 1/1971 | Maus | |
| 3,575,756 A | 4/1971 | Maus | |
| 3,775,214 A | 11/1973 | Winters | |
| 4,062,917 A | 12/1977 | Hill et al. | |
| 4,068,704 A | 1/1978 | Wittmoser | |
| 4,097,977 A | 7/1978 | Pollner | |
| 4,128,375 A | 12/1978 | Schubart | |
| 4,132,755 A | 1/1979 | Johnson | |
| 4,133,626 A | 1/1979 | Schubart | |
| 4,311,661 A | 1/1982 | Palmer | |
| 4,330,250 A | 5/1982 | Pinkas | |
| 4,560,523 A | * 12/1985 | Plumley et al. | 264/102 |
| 4,562,033 A | 12/1985 | Johnson et al. | |
| 4,622,091 A | 11/1986 | Letterman | |
| 4,759,893 A | 7/1988 | Krauter | |
| 4,836,765 A | 6/1989 | Kornitzky et al. | |
| 4,853,170 A | 8/1989 | Buhler et al. | |
| 4,902,215 A | 2/1990 | Schubart | |
| 4,942,013 A | * 7/1990 | Palmer et al. | 264/511 |
| 5,000,990 A | * 3/1991 | Freeman | 428/36.1 |
| 5,013,514 A | * 5/1991 | Azzani et al. | 264/512 |
| 5,108,532 A | 4/1992 | Thein et al. | |
| 5,152,949 A | * 10/1992 | Leoni et al. | 264/257 |
| 5,169,590 A | 12/1992 | Johnson et al. | |
| 5,366,684 A | * 11/1994 | Corneau, Jr. | 264/510 |
| 5,439,635 A | * 8/1995 | Seemann | 264/510 |

FOREIGN PATENT DOCUMENTS

EP   0 348 831   * 1/1990

* cited by examiner

Primary Examiner—Jan H. Silbaugh
Assistant Examiner—Stefan Staicovici
(74) Attorney, Agent, or Firm—James Creighton Wray; Meera P. Narasimhan (57) ABSTRACT

The present invention relates to methods and apparatus of molding composite parts by liquid resin infusion. The invention involves the creation of temporary resin distribution channels on the surface of a preform to aid in the distribution of resin during infiltration. In general, these methods are improvements over the art because the molds are cheaper to make, the parts produced are of higher quality, minimal waste is produced and the time to infiltrate the preform is reduced.

19 Claims, 9 Drawing Sheets

COMPOSITE MOLDING METHOD AND APPARATUS

BACKGROUND OF THE INVENTION

There are many processes available for the purpose of impregnating a preform with liquid resin in order to make a composite. These processes may be broadly characterized into two categories. One category includes wet lay-up methods while the other category features some form of resin infusion such as resin transfer molding (RTM).

Wet lay-up processes tend to have lower average quality than resin infused parts. They are labor intensive to manufacture because each layer of preform material must be individually coated with resin and carefully positioned by hand. One frequent problem with wet lay-up methods is air bubble entrapment inside the composite while the resin is being applied to the preform. A second difficulty is achieving a uniform part thickness and fiber volume fraction which ultimately influence the material properties. Another problem with wet lay-up processes is the excessive amount of fumes given off by the exposed resin before and during cure.

Resin infusion methods are carried out in a closed system which eliminates most of the fumes. Resin infusion processes can also infuse resin into a preform with a vacuum thus avoiding air bubble entrapment. Resin infusion methods allow for better control over part dimensions and fiber volume fraction. Thus, resin infusion methods overcome many of the limitations of wet lay-up processes. Unfortunately, until recently resin infusion processes tended to be more expensive than wet lay-up because of the more expensive molding apparatus required. In the past, a rigid closed mold was required. Even though closed mold methods are improvements over wet lay-up methods, there are problems with closed mold methods beyond that of cost. When infiltrating high volume fraction preforms, standard closed mold methods require high resin injection pressures and long infiltration times because the low permeability of high volume fraction preforms.

More recently, several novel vacuum infusion techniques were introduced which do not require an expensive closed mold. Instead, they incorporate a single rigid mold surface upon which the preform rests. The preform is covered by a impermeable sheet and is sealed at its periphery forming a preform cavity which can be evacuated using a vacuum pump. Atmospheric pressure provides both the compaction force on the preform and also the driving force for resin infusion from an external supply into the lower pressure preform cavity. Despite the simplicity of this approach there were still problems with the infusion process because many high viscosity resins could not adequately infiltrate low permeability preforms.

The resistance to resin infiltration increases with the distance the resin must flow through the preform. In vacuum assisted resin infusion, the injection pressure cannot exceed the ambient atmospheric pressure without pressing the outer sheet away from the preform. Thus, infiltration is often slow and incomplete. Often, regions of the preform are not infiltrated with resin, while excess resin collects in undesired locations.

One clever way to overcome the problem of a low permeability preform was to artificially increase the permeability at certain locations within the preform cavity. There have been several embodiments of this fundamental concept in the art These include but are not limited to: placement of tubular arteries between adjacent preform layers, drilling an array of holes in a rigid plate which rests on the preform, and the use of a distribution medium on top of the preform. All these methods have their own limitations. Of the methods, the processes incorporating a distribution medium are the most useful. They are also the most closely related methods to those disclosed in the present patent and therefore will be described in greater detail.

In the distribution medium process, a preform is placed on a tool surface and covered with a permeable sheet. A distribution medium is placed on top of the permeable sheet and is covered with a continuous non-permeable sheet sealed at its periphery. A vacuum is drawn on the entire assembly of preform, permeable sheet, and distribution medium. Resin is introduced to the distribution medium which provides high permeability pathways for the resin to distribute itself over the entire top surface of the preform. The injection pressure, which must be less than atmospheric pressure, forces most of the resin through the permeable membrane and into the preform. Satisfactory resin impregnation is usually achieved since there is a relatively small resistance to infiltration of the preform in the thickness direction in comparison with the in-plane direction. The lower resistance to infiltration also results in shorter infusion times.

Despite the benefits of this improved resin infusion method, it still has some disadvantages which make it unattractive for many applications. When resin comes into contact with the distribution medium it remains trapped in the distribution medium and is subsequently cured. After the resin has cured, the permeable membrane, the clogged distribution medium, and the impermeable outer membrane must be separated from the composite part and discarded as waste. While the process is quite useful for proto-typing and low volume production, the amount of waste produced is incompatible with the required efficiencies of mass production.

These and other problems remain in the field of infusion molding of composite structures. In this patent we describe novel means of overcoming the aforementioned difficulties.

SUMMARY OF THE INVENTION

The molding methods and apparatus of the present invention have many different uses, and the apparatus can take on different forms. An example is provided of infiltrating an advanced composite preform, which is an assemblage of reinforcing fibers, with a liquid plastic resin. What in general could be any low permeability material will in the following disclosure be called the preform. The infiltrating fluid could be one of many different fluids, such as gases, liquids, and liquids containing suspended solid particles, which in the description are collectively referred to hereafter as resin.

The preform can be can be made from a variety of reinforcing fibers including fiberglass, Kevlar (aramid) fibers, and carbon fibers. There are many types and configurations of fibers and yams made from fibers. The yarns may be formed into many different types of assemblages including weaves, braids, and knits as well as short and long fiber mats. Different types of fibers may be combined in an assemblage to form a hybrid preform. All these and other variations are known by those skilled in the art. The preform may also include inserts of various types such as foam cores, honeycomb cores, balsa wood, metal inserts and reinforcements. Additionally, the preform may contain sensors or other devices. All of these components are known in the prior art.

The resin is any of a variety of curable liquid resins such as polyester, vinyl ester, and epoxy. The resins may be catalyzed for high temperature cure or room temperature cure and for various cures times as is compatible with the needs of the molding process. The resin should be properly catalyzed and degassed prior to injection into the preform cavity. The wide variety of useful resins and the methods of preparing the resin are all widely known in the art.

In each of the embodiments of the invention, it is desirable that a vacuum be drawn on the cavity containing the preform prior to beginning the flow of resin. In this way, the problem of entrapping an air bubble in the resin is avoided. A source of vacuum may continue to be applied to the preform cavity during the infiltration of resin and until the resin has cured or it may be removed at some point during the infiltration. Even if the source of vacuum is removed (by closing a valve for example) the space inside the preform cavity should remain substantially a vacuum during resin infiltration if the preform cavity is properly sealed. In some embodiments of the invention, it is possible to infiltrate the preform with resin without initially drawing a vacuum on the preform cavity. However, since this method introduces the possibility of trapping an air bubble in the preform and it is easy to draw a vacuum on the preform cavity, this method is not recommended.

The number and position of the sources of vacuum and resin depend on the specific application. Each resin and vacuum source is able to be controlled individually using a valve or other means of stopping the flow of material through the source. The flow of resin should be stopped when sufficient resin has entered the mold. This may be controlled by properly controlling the cure time and/or measuring the amount of resin that has entered the mold and stopping the flow of resin when sufficient resin has entered the mold.

Temporary Resin Distribution Channels

As is discussed in the Background to the Invention, the prior art contains various means of aiding the distribution of resin over the surface of a preform for the infiltration of a preform with resin. However, none of these methods provides a means of creating temporary resin distribution pathways on the surface of the preform. The advantage of temporary resin distribution channels over the use of a distribution medium is a major reduction in the amount of waste material produced. When producing composites in large quantities, this large amount of waste is costly and a source of pollution and therefore should be eliminated.

Though there are many features and embodiments of the present invention, the essence of the invention is a method and the related apparatus for molding a composite by infusing resin into a permeable preform, comprising the creation of temporary resin channels on the surface of the preform, flowing resin along the channels and from the channels into the preform, stopping the flow of resin, removing the temporary channels if desired, curing the resin in the preform and forming a composite. The methods disclosed in this patent are able to produce a composite if the temporary resin distribution channels are not removed before curing the resin. In this case, cured resin channels remain on the surface of the preform. This is not desirable in most applications and therefore, in the preferred embodiments of the invention, the resin flow channels are removed prior to curing the resin so that there are no cured resin flow channels on the surface of the composite.

There are several means of creating temporary resin distribution channels. One method comprises activating movable portions of the mold surface to create a network of resin distribution channels on the surface of the preform and deactivating them to remove the channels. These movable portions of the mold surface can be constructed in various ways. In a rigid mold, sections of the mold can be made so they are retractable. These portions can be retracted to create the resin flow channels and extended to remove the channels after sufficient resin has entered the preform cavity. The retractable sections of the rigid mold should be constructed in such a way that they do not leak resin.

Constructing retractable sections on the internal surface of the mold makes the mold more expensive than the usual mold used in RTM. However, the speed of infiltration allowed by having high permeability pathways over the surface of the preform is worth the extra cost. This method retains the advantages of closed mold RTM such as good dimensional accuracy and high fiber volume fraction while overcoming difficulties such as high injection pressures and slow infiltration of resin when infiltrating high volume fraction preforms. Also, the problem of determining the proper resin inlet and outlet positions is eliminated.

Under the present art, much effort is put into determining the time evolution of the resin flow front in order to properly place resin inlets and outlets and to determine the time required to inject resin so that the preform is fully impregnated. The use of temporary resin distribution channels essentially eliminates this problem since the time to infiltrate the preform is reduced and the progression of the flow front is easily controlled by the resin distribution network pattern. The methods used to calculate resin flow front evolution are computationally difficult and still a topic of active research.

It is desirable to avoid the problem of resin source and outlet placement entirely by using the resin distribution channels to control the flow front progression. Optimization of the inlet and outlet positions requires repeated calculations and/or experimental trial and error. Both of these tasks are expensive. The network of resin distribution channels provides rapid resin infusion without complicated calculations or expensive trial and error experimentation. In the case of high volume production, the increased speed of resin infusion, the shorter mold development times, and the lower risk of making an unsatisfactory mold are all worth the extra cost of the moveable mold channels.

Another method of creating temporary resin distribution channels is to have mechanically movable portions of the mold surface which are made of a stiff elastomeric material. A means of deforming the stiff elastomeric material into resin distribution channels is provided in the body of the mold. This embodiment of the invention provides a simple, cost effective means of creating temporary resin distribution channels in the surface of the mold. After resin has infiltrated the preform, the stiff elastomeric portions of the mold are pushed into a position flush with the surface of the preform. At this point, curing of the resin may begin.

Instead of deforming or moving portions of rigid molds, a thin flexible membrane can be placed over the preform and portions of the membrane can be caused to deform into resin distribution channels by various means. The various embodiments of this general class of molding apparatus have advantages over the previous embodiments in terms of the cost and ease of making and preparing the mold.

One of the means of deforming the flexible impermeable membrane involves applying mechanically or electro-mechanically induced forces at distributed points along the surface of the flexible membrane. These forces cause the membrane to move away from the surface of the preform temporarily to allow the resin to flow over the surface of the preform.

There are various embodiments of the invention which use an impermeable flexible membrane which is temporarily deformed into resin distribution channels on the surface of a preform. One set of these embodiments relies on a differential pressure between the preform side of the flexible membrane and the other side of the membrane. By properly applying a higher pressure on the preform side of the membrane than the other side of the membrane, the flexible membrane will deform into temporary resin distribution channels. When the proper amount of resin has infiltrated the preform, a source of fluid (usually air) at the proper pressure is applied to the channels in the mold surface. The applied pressure should be greater than the pressure of the resin under the flexible membrane. In this way the resin distribution channels on the surface of the preform are collapsed and the flexible membrane presses down evenly and smoothly over the preform. In fact, the pressure of the resin plus the pressure compressing the preform is equal to the pressure on the other side of the flexible membrane. Thus, by adjusting the amount of resin in the preform and the applied external pressure, the amount of preform compression can be controlled within certain limits.

One method of applying a differential pressure between the two sides of the flexible membrane is to cover the flexible membrane with a mold which contains a network of channels in its surface. Resin is then introduced to the preform side of the flexible membrane at a pressure higher than the pressure on the other side of the membrane. This causes the membrane to be forced out and away from the preform and the membrane then takes on the shape of the internal surface of the containing mold. Since this containing mold has a network of channels in its surface, the flexible membrane now has created a network of resin distribution channels on the surface of the preform.

In one embodiment of the invention which uses a flexible impermeable membrane covered by a mold with internal surface channels, the mold is made from a rigid sheet material with channels impressed upon its surface. The rigid sheet material may be sheet metal or other suitable rigid sheet materials which can be formed into the proper shape. As with the majority of the embodiments of the invention described in this disclosure, it is desirable to maintain a vacuum in the cavity containing the preform. Additionally, it is desirable in this embodiment to maintain a vacuum in the channels in the surface of the rigid sheet above the flexible membrane. Thus, before resin is introduced, there is a vacuum on both sides of the flexible membrane and therefore, the flexible membrane does not deform. Additionally, the ambient atmospheric pressure presses down upon the rigid sheet which in turn presses down on the flexible membrane in regions where there is not a channel. These regions of the flexible membrane in turn press down upon the preform compacting it to a high fiber volume fraction. When liquid resin is introduced under the flexible membrane, the resin presses the flexible membrane into the channels in the surface of the rigid sheet thereby creating temporary resin distribution channels on the surface of the preform. These high permeability channels allow the resin to easily and quickly spread out over the preform and infiltrate the preform quickly and completely. Since all points in the preform are only relatively short distances from a channel in a properly design channel network, the resin has no difficulty reaching all points in the preform. After resin has impregnated the preform, the vacuum in the channels is removed and atmospheric pressure is applied to the channels forcing the flexible membrane against the preform.

In another embodiment of the flexible impermeable membrane covered by a mold with internal surface channels, the mold is made from thick rigid material with a network of channels formed in its surface. The rigid material may be a strong material such as steel. This embodiment provides greater dimensional accuracy for the composite. Also, the compacting pressure is not limited to atmospheric pressure. Higher resin injection pressures are possible since the thick and rigid material can support the flexible membrane. Thick and rigid molds are more expensive and difficult to make than rigid sheets with channels. This is especially true for very large parts. Thus, both embodiments are useful and the specific application will determine which embodiment is most appropriate.

Each of the previous two embodiments of the invention require that the pressure on the preform side of the flexible membrane exceed the pressure on the other side of the membrane. The preferred method of creating this situation is to apply a source of vacuum to the channels in the internal surface of the mold. It is possible to include a layer of porous material known in the art as breather material between the mold surface and the flexible membrane to aid in quickly and evenly evacuating the channels.

An alternate method of causing the flexible membrane to deform into temporary resin distribution channels which still relies on a differential pressure between the preform side of the flexible membrane and the other side of the membrane but does not use a mold with a network of channels in its surface is to use a spacer system. A spacer system is a system of sturdy shapes inter-connected in such a way that they provide a network of gaps into which the flexible membrane can deform to create temporary resin distribution channels when the pressure on the preform side of the flexible membrane exceeds the pressure on the other side of the membrane where the spacer systems is located.

There are many appropriate forms of the spacer system. One form, called a link mat, is a geometric array of spacer blocks connected to each other with link rods. The blocks and link rods can be made of plastic or other suitably sturdy material. The link mat is placed on top of the flexible impermeable membrane which is in contact with the preform and then covered with an additional flexible impermeable membrane which is able to be sealed against the first membrane. The purpose of the second membrane is to allow a reduced pressure to be applied to the cavity containing the spacer system.

Another form of spacer system is similar to a woven mat which is also covered with an impermeable outer cover. The mat consists of large flexible rods in the weft direction held together with thin yarns in the warp direction. This arrangement produces a series of channels between the larger rods. The flexible membrane deforms into these channels during resin infusion and the resin distribution channels formed under the membrane and on the surface of the preform aid in flowing resin over the surface of the preform. When higher pressure fluid such as air is introduced to the cavity containing the fabric mat, the impermeable membrane between the preform and the fabric mat is pushed smoothly and evenly against the preform.

Yet another form of the spacer system is a bubble mat or inflatable bubble mat. A bubble mat is a flexible sheet with an array of bubbles on its surface. An inflatable bubble mat has a series of small inter-connections which allow the bubbles to be inflated or deflated. In both cases, the gaps between the bubbles provide a network of channels for the flexible membrane in contact with the preform to deform into when the pressure on the preform side of the flexible membrane is higher than the pressure on the bubble mat side.

The spacer systems discussed above may also contain a layer of breather material to aid in quickly and evenly adjusting the pressure in the spacer system cavity.

In one embodiment, the flexible membrane and the spacer system is combined into one unit. An inflatable bubble mat is placed on a preform which is resting on a tool surface. The bubble mat is sealed at its periphery on the tool surface so that a vacuum can be drawn on the preform cavity. The bubbles in the bubble mat are then inflated which causes the bubble mat to lift away from the preform and thereby create a system of resin distribution channels on the surface of the preform. Resin is injected under the bubble mat and flows through the channels and from the channels into the preform. When sufficient resin has entered the preform cavity, the source of resin is stopped and the bubbles are deflated allowing the bubble mat to press down smoothly and evenly over the surface of the preform.

In the embodiments of the invention disclosed so far, the temporary resin distribution channels have been created by either mechanically moving sections of the mold surface or deforming a flexible impermeable membrane by some means. In another set of embodiments of the invention, the temporary channels on the surface of the preform comprise a flexible mold material containing interior channels below the surface. A resin pressure on the preform side of the flexible mold greater than the pressure in the channels below the surface of the flexible mold causes the flexible mold material between the channels and the preform to deform into the interior channels and thereby create resin distribution channels on the surface of the preform. It is preferable in this embodiment of the invention that a vacuum be drawn on the cavity containing the preform and that a vacuum also be drawn on the channels below the surface of the flexible mold material during resin infusion. After a sufficient amount of resin has entered the preform, the source of resin and vacuum are stopped and a pressure higher than the pressure of the resin in the preform cavity is applied to the channels. This causes the material between the preform and the channels to move toward the preform and become flush with the surface of the preform. Curing the resin after the channels have been removed provides a composite with a smooth surface.

DETAILED DESCRIPTION OF FIGURES

Figure 1:
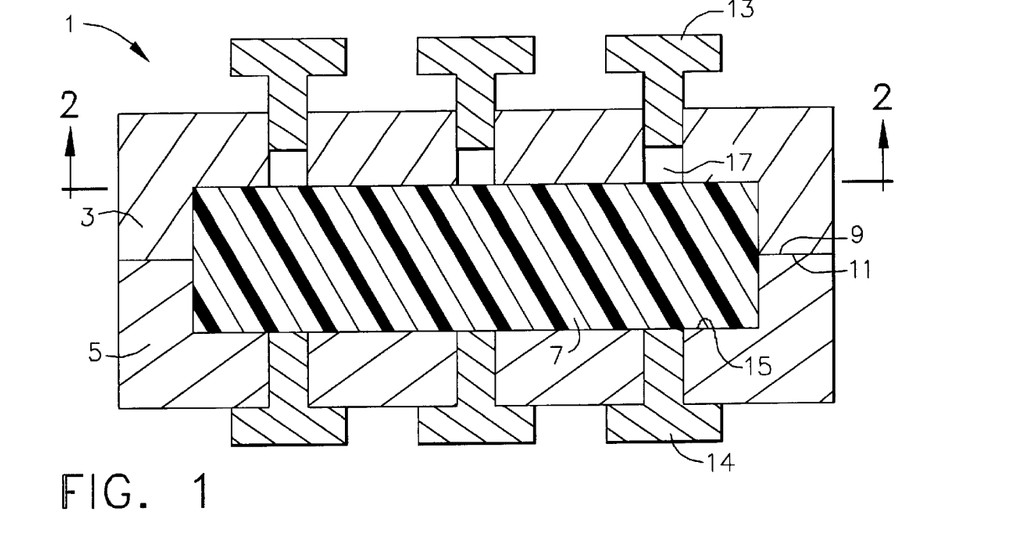
FIG. 1 shows mechanical channels.
Figure 2:
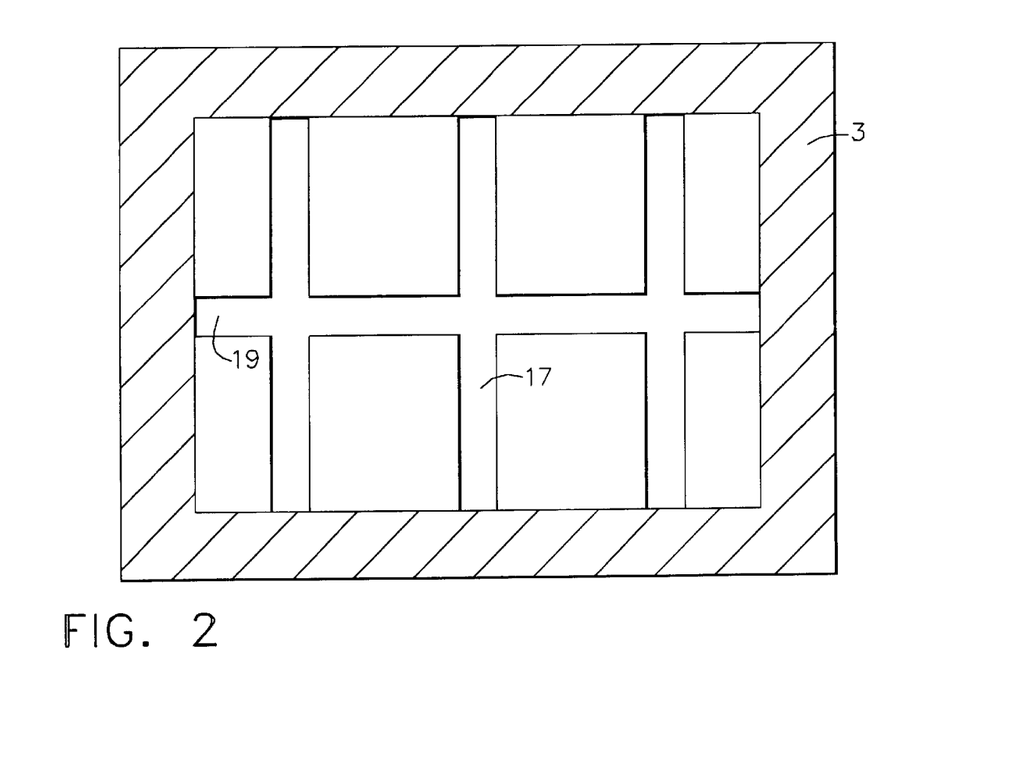
FIG. 2 is a section through 2—2 of FIG. 1.

FIG. 1 shows generally a mold 1 with upper 3 and lower 5 halves enclosing a preform 7. The mold upper and lower halves meet at surfaces 11 and 9. Mechanically movable portions of the mold 14 are shown aligned with the internal mold surface 15. The mechanically movable portion of the mold 13 is retracted to create a network of resin flow channels 17. FIG. 2 shows a cross-sectional view of the upper mold half 3 with the preform removed. The network of vertical 17 and horizontal 19 resin flow channels allows resin to easily spread out over the surface of the preform and then into the preform. Obviously, there are many different possible configurations of the resin flow channels.

Figure 3:
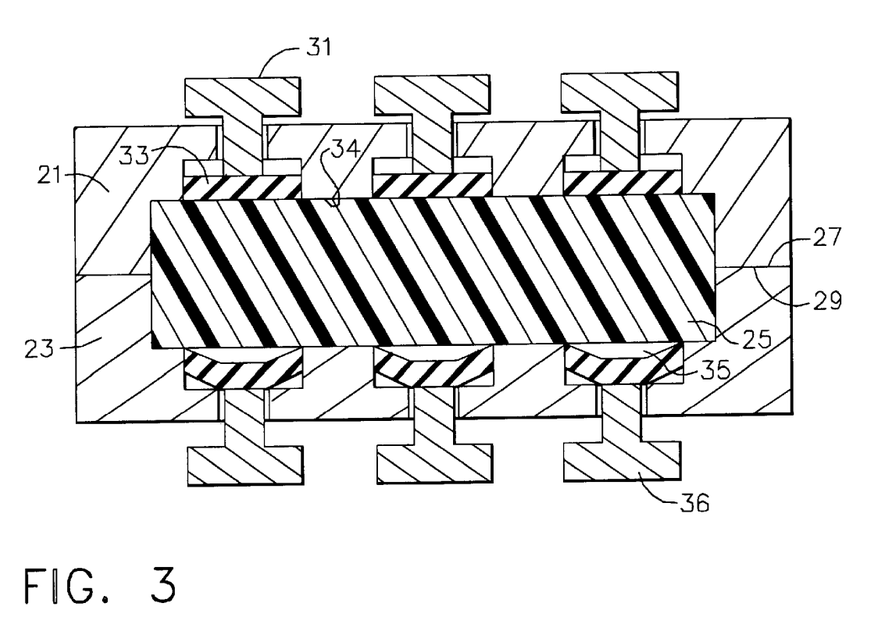
FIG. 3 shows mechanically moved membranes.

FIG. 3 shows a modified mold with upper 21 and lower 23 halves enclosing a preform 25. The mold upper and lower halves meet at parting line surfaces 29 and 27. Mechanically movable portions of the mold 31 are attached to flexible portions of the mold surface 33 in a position aligned with the internal mold surface. The mechanically movable portions 36 are retracted thereby creating a network of resin distribution channels 35 in the surface of the mold.

Figure 4:
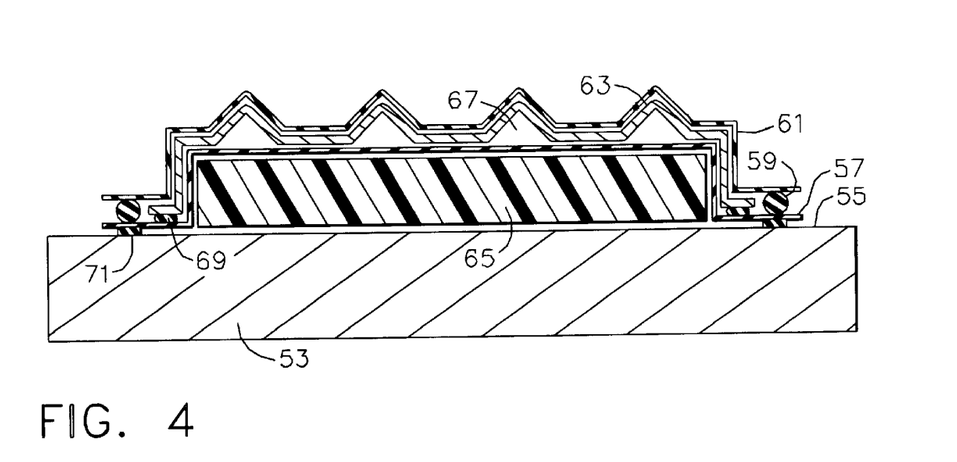
FIGS. 4 and 5 show membranes and a rigid sheet.
Figure 5:
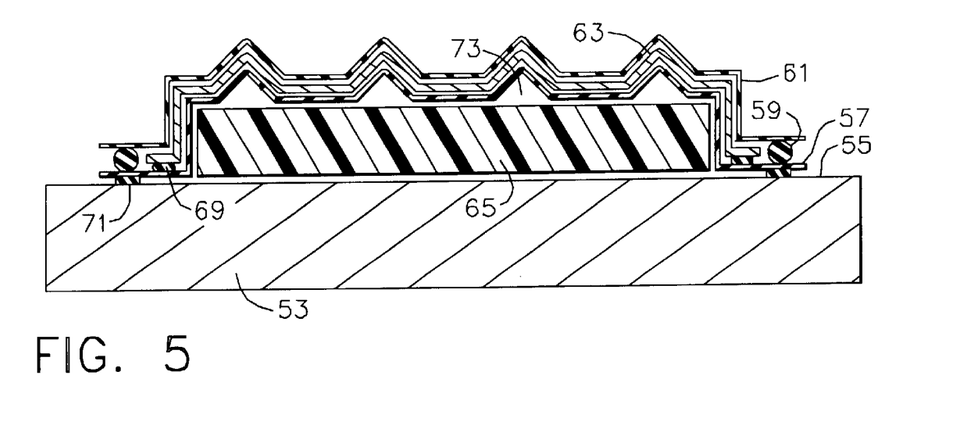

FIG. 4 shows a tool 53 with a surface 55 on which is placed a preform 65. The preform is covered with a flexible membrane 57 which is sealed at its periphery using a seal 71. A rigid sheet of material 63 with a network of resin distribution channels 67 is placed over the flexible membrane 57 and sealed at its periphery with a seal 69. An additional flexible impermeable membrane 61 is placed over the rigid sheet 63 and sealed at its periphery with a seal 59. FIG. 5 shows the apparatus of FIG. 4 with the flexible membrane 57 deformed into the channels in the rigid sheet 63 thereby creating a resin distribution channel 73 on the surface of the preform 65. The outer impermeable membrane 61 helps to maintain the seal the cavity containing the rigid sheet.

Figure 6:
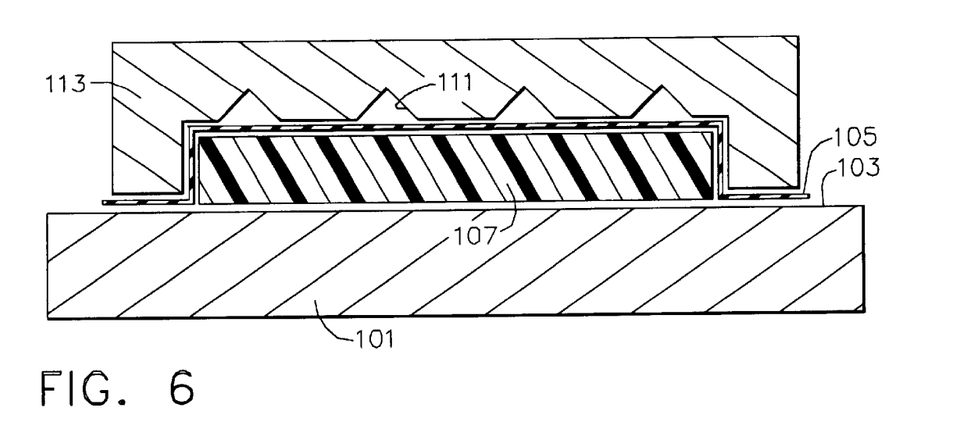
FIGS. 6 and 7 show a membrane and a rigid mold.
Figure 7:
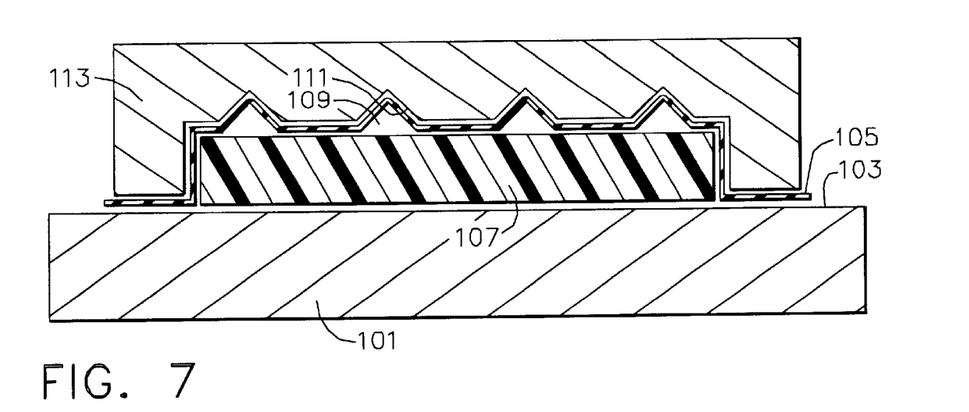

FIG. 6 shows a tool 101 and tool surface 103 onto which a preform 107 has been placed. The preform is covered with a flexible membrane 105 over which is placed a rigid mold 113 which has a network of channels 111 in its surface. FIG. 7 shows a similar arrangement. In FIG. 7, a preform 107 is placed on a tool surface 103 of a tool 101. A flexible membrane 105 is placed over the preform 107 and a rigid mold half 113 is placed over the flexible membrane 105. A network of channels 111 in the surface of the upper mold half 113 creates channels 109 for the flexible membrane to deform into when resin is injected under the flexible membrane 105.

The process of deforming the flexible membranes into the channels in the surface of rigid sheets or rigid molds involves applying a source of resin to the preform side of the membrane and reducing the pressure on the other side of the flexible membrane. Preferably, a vacuum is created in the channels in the mold. To aid in this process, it is useful to use a breather material between the flexible membrane and the mold. The breather material allows a vacuum to develop evenly throughout all the channels.

Figure 8:
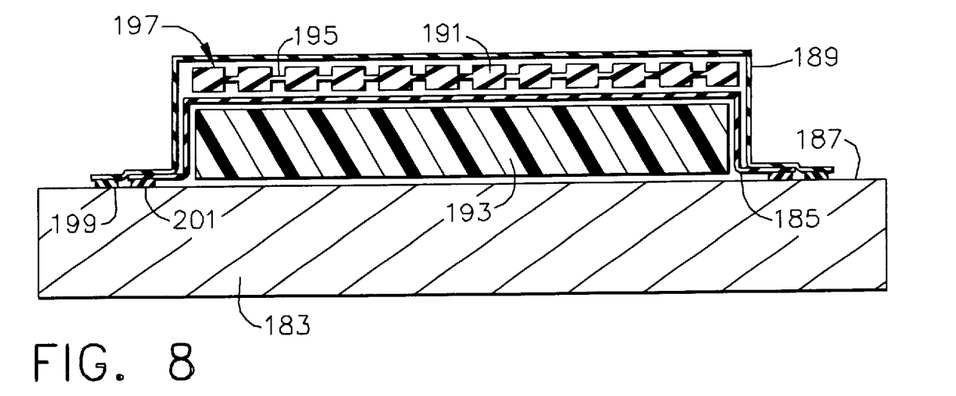
FIGS. 8–10 show details of a spacer and membranes.

FIG. 8 is the first in a series of figures depicting apparatus for creating temporary resin flow channels on the surface of a preform using a flexible membrane, a spacer system, and a differential pressure between the preform side of the membrane and the spacer system side of the flexible membrane. FIG. 8 shows a tool 183 and tool surface 187 upon which is placed a preform 193 which in turn is covered with an impermeable flexible membrane 185 sealed at its periphery with a seal 201. On top of the flexible membrane is a spacer system 197 and over the spacer system is another impermeable flexible membrane 189 which is also sealed at its periphery with a seal 199. The spacer system is any device capable of separating the two membranes so that a differential pressure between the preform and the cavity containing the spacer system causes the flexible membrane 185 to deform into a network of temporary resin distribution channels on the surface of the preform. Obviously there are many types and forms of suitable spacer systems.

Figure 9:
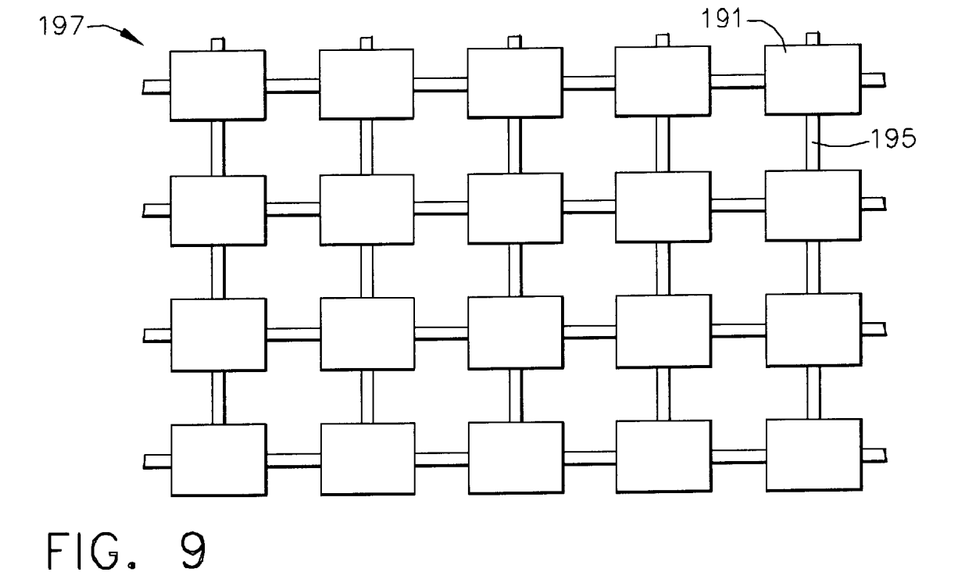
Figure 10:
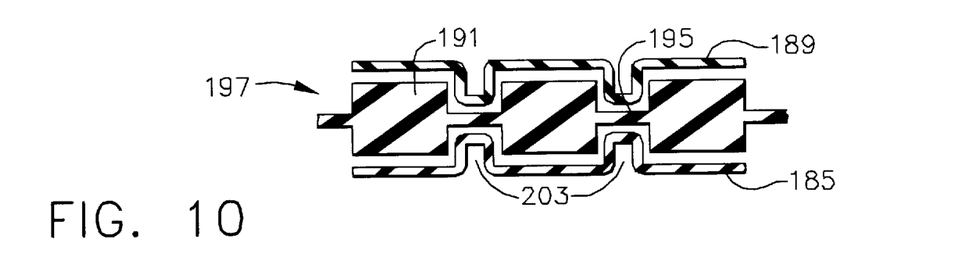
Figure 11:
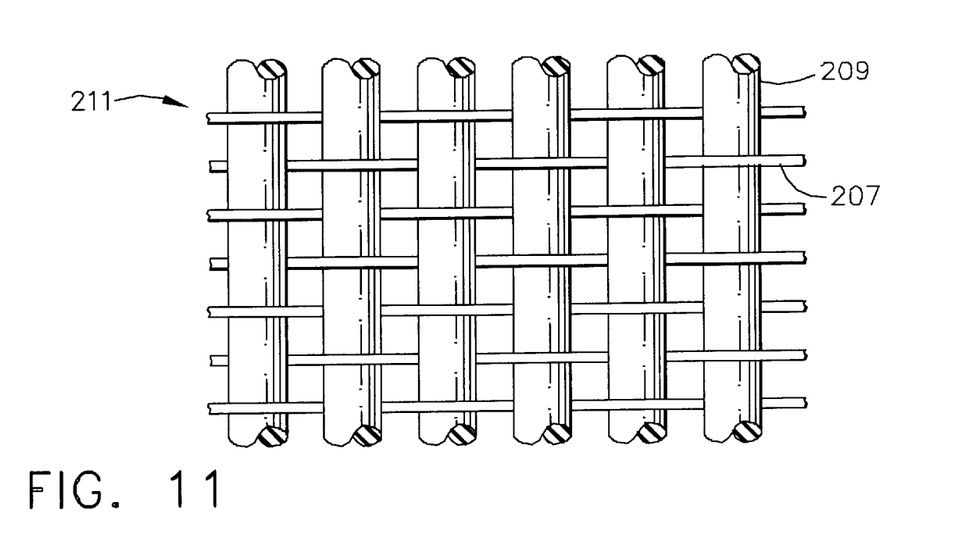
FIGS. 11 and 12 show details of an alternate spacer.
Figure 12:
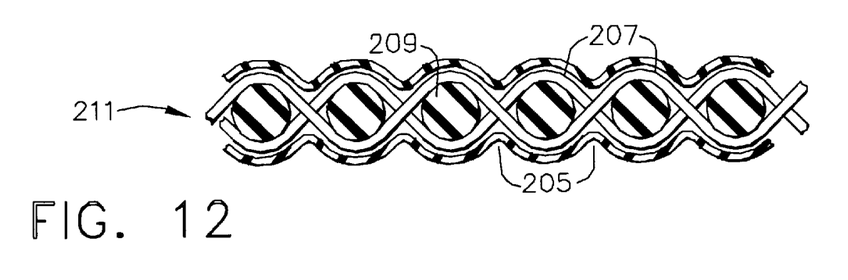

Two spacer systems are shown in FIGS. 9–12 in more detail. FIG. 10 shows an individual spacer 191 and an inter-connecting link 195 between two spacers. Additionally, the flexible membranes are deformed to create resin distribution channels 203. FIG. 9 shows a top view of the spacer system 197. When properly designed, a spacer system is able to conform easily to the surface of a preform. FIG. 12 shows in detail a spacer system made from a special fabric. Flexible rods 209 inserted in the weft direction are held together with smaller yarns 207 in the warp direction. The flexible membrane is deformed to create temporary resin distribution channels 205. FIG. 11 shows a top view of the fabric spacer system 211 with rods 209 and connecting yarns 207.

Figure 13:
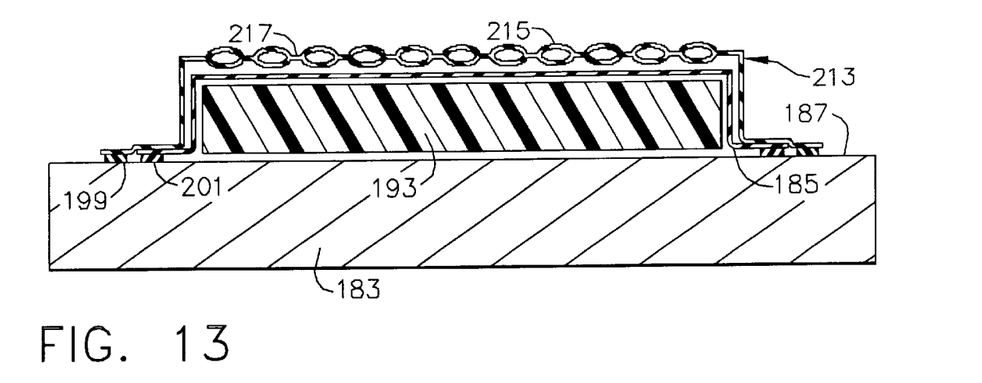
FIGS. 13–15 show details of a bubble mat used with a membrane.
Figures 14, 15:
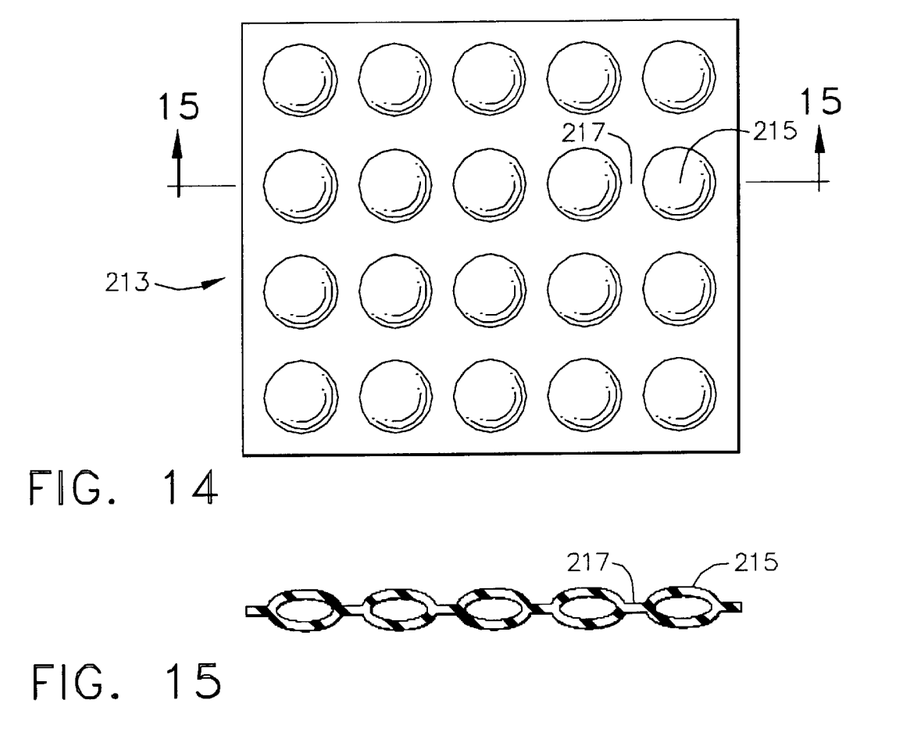

FIG. 13 shows the apparatus of FIG. 8 except the spacer system 197 and outer flexible membrane 189 are replaced with a bubble mat 213. The bubble mat is similar to that used as padding when shipping delicate items. The details of the bubble mat are shown in FIGS. 14 and 15. In FIG. 14, the bubble mat 213 is shown in a top view. An array of bubbles 215 are held together by connecting material 217. The flexible membrane 185 is deformed into the space between the bubbles to create temporary resin distribution channels.

Figure 16:
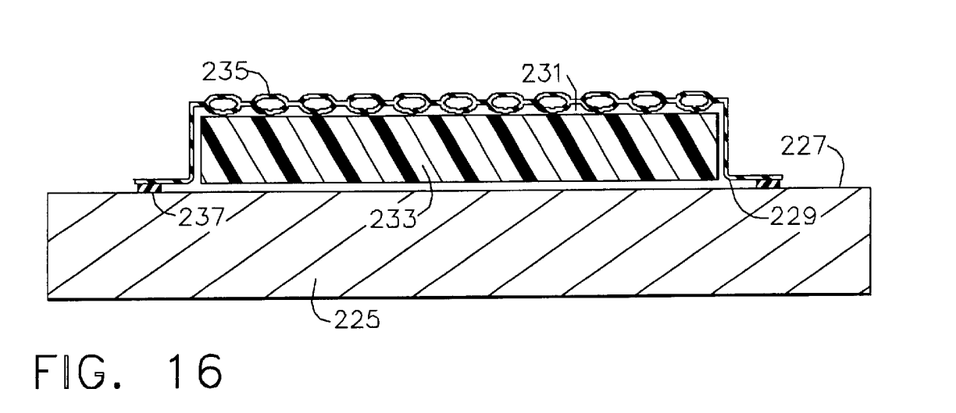
FIGS. 16–18 show details of an inflatable bubble membrane and mold.
Figure 17:
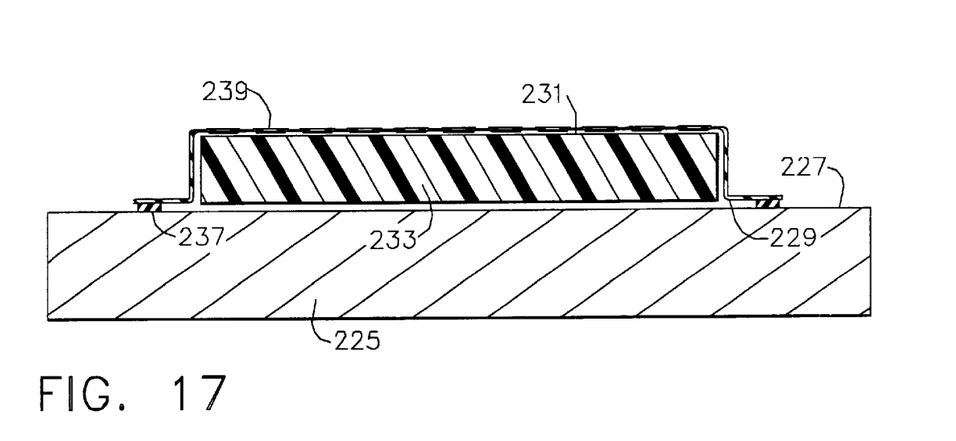
Figure 18A:
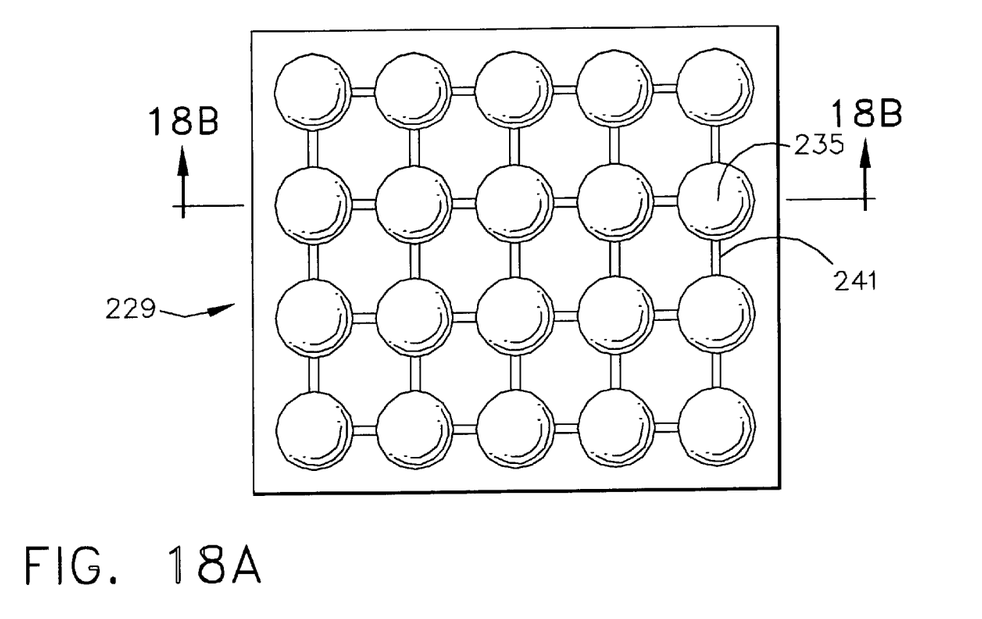
Figure 18B:
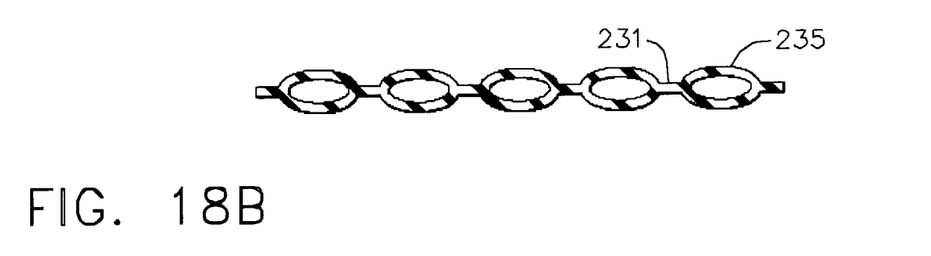
Figure 18C:
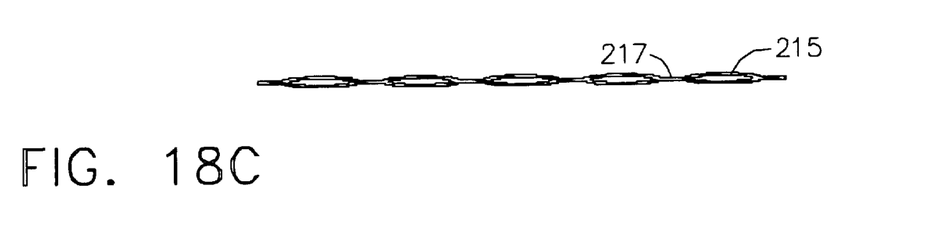

FIGS. 16 and 17 show a molding apparatus in which the flexible membrane 185 and the bubble mat spacer system 213 of FIG. 13 have been combined into one item 229. In FIG. 16, a preform 233 is placed on a tool surface 227 of a tool 225, and covered with an inflatable bubble mat 229. The bubble mat is sealed at its periphery with a seal 237. The bubbles 235 and the connecting material form resin distribution channels 231 when the bubbles are inflated. FIG. 17 shows the apparatus of FIG. 16 when the bubbles are deflated 239 and the distribution channels 231 are removed. The inflatable bubble mat 229 presses smoothly and evenly upon the preform 233. FIGS. 18A, 18B, and 18C detail some of the features of the inflatable bubble mat. In FIG. 18A, the inflatable bubble mat 229 is shown in a top view. The bubbles 235 are inter-connected via thin passages 241. The system of bubbles and inter-connections allows all the bubbles to be inflated or deflated from one source of compressed gas or vacuum as the case may be. FIGS. 18B and 18C clearly show the cross-sectional shape of the bubble mat in the inflated and deflated configurations. In these figures it is easy to see how the temporary resin distribution channels 231 on the surface of the preform are created and removed by inflating and deflating the bubbles.

Figure 19:
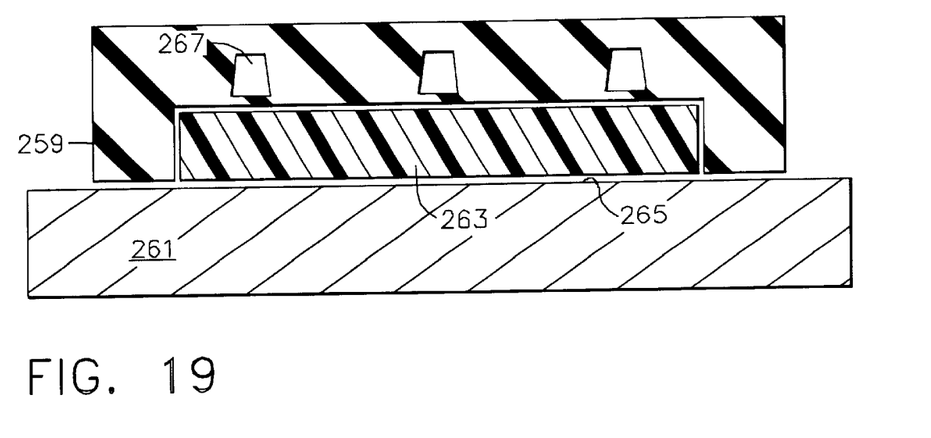
FIGS. 19 and 20 show details of forming channels in a flexible mold.

FIG. 19 shows a mold which incorporates a flexible mold material such a silicone rubber. The surface of the mold is in the shape of the final part when the mold is in the relaxed configuration. A network of resin distribution channels can be made to appear on the surface of the preform by reducing the pressure in a system of channels in the body of the flexible mold material. In the body of the mold half are channels 267 which form a network of passages just beneath the internal surface of the mold.

Figure 20:
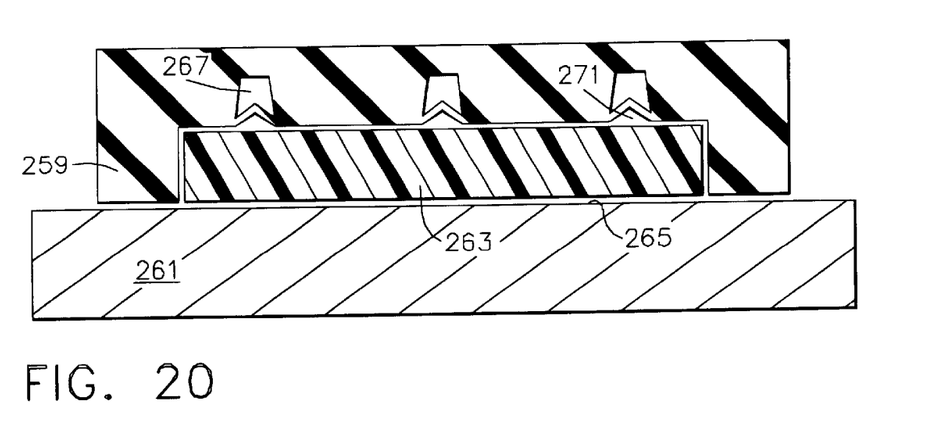

FIG. 19 shows a preform 263 placed on the tool surface 265 and the upper half of the mold 259 made of flexible mold material containing a network of channels 267 beneath the internal surface of the mold. FIG. 20 shows the apparatus of FIG. 19 with the upper mold half 259 deformed to form resin distribution channels 271 on the internal surface of the upper mold half 259.

We claim:

1. A method of molding a composite by flowing resin into a permeable preform contained in a molding apparatus comprising creating temporary resin flow channels on a surface of the preform, by placing a flexible impermeable membrane on portions of the preform, placing a spacer system over the flexible impermeable membrane, placing a second flexible impermeable membrane over the spacer system, and deforming the flexible impermeable membrane adjacent the preform into temporary resin flow channels by applying a higher pressure on the preform side of the flexible impermeable membrane than on the other side of the flexible impermeable membrane thereby creating a differential pressure which deforms the flexible impermeable membrane into the temporary resin flow channels, drawing a vacuum on the preform prior to flowing the resin into the preform, flowing the resin along the temporary resin flow channels and from the temporary resin flow channels into the preform, impregnating the preform with the resin, stopping the flow of the resin, removing the temporary resin flow channels, by returning the flexible impermeable membrane to a position flush with the surface of the preform by reversing the differential pressure, curing the resin in the preform and forming the composite, wherein deforming the flexible impermeable membrane into the temporary resin flow channels using the differential pressure comprises deforming the flexible impermeable membrane into a network of gaps in the spacer system adjacent to the flexible impermeable membrane, said flexible impermeable membrane deforming to take on the shape of a spacer system surface and thereby forming the temporary resin flow channels, and reversing the differential pressure to remove the temporary resin flow channels comprises applying a pressure to the spacer system greater than a pressure of the resin in the preform thereby removing the temporary resin flow channels and causing the impermeable flexible membrane to press evenly upon the surface of the permeable preform.

2. The method of claim 1, wherein creating the temporary resin flow channels comprises mechanically activating movable portions of a mold surface, and removing the temporary resin flow channels comprises mechanically deactivating the movable portions of the mold surface.

3. The method of claim 1, wherein portions of a mold surface comprise an elastomeric material and creating the temporary resin flow channels comprises mechanically or electro-mechanically drawing the elastomeric material into channels in a mold to create the temporary resin flow channels, and removing the temporary resin flow channels comprises returning the elastomeric material to a position flush with the surface of the preform.

4. The method of claim 1, further comprising maintaining a vacuum in the spacer system during resin flow to aid in creating the differential pressure between the preform side of the flexible impermeable membrane and the spacer system side of the flexible impermeable membrane, and further comprising removing the vacuum prior to curing of the resin and applying atmospheric pressure to the spacer system, the atmospheric pressure being greater than a pressure of the resin in the preform, thereby removing the temporary resin flow channels and causing the flexible impermeable membrane to press evenly upon the surface of the preform.

5. The method of claim 1, further comprising placing a breather layer within a cavity containing the spacer system to facilitate adjustment of a pressure in the spacer system when deforming the flexible impermeable membrane into the temporary resin flow channels and when removing the resin flow channels.

6. The method of claim 1, wherein the spacer system comprises one or more of the embodiments of spacer systems including link mat with an impermeable cover, bubble mat, inflatable bubble mat, and a fabric mat with an impermeable cover.

7. A method of molding a composite by flowing resin into a permeable preform contained in a molding apparatus comprising creating temporary resin flow channels on a surface of the preform, by placing a flexible impermeable membrane on portions of the preform and deforming the flexible impermeable membrane into the temporary resin flow channels, drawing a vacuum on the preform prior to flowing the resin into the preform, flowing the resin along the temporary resin flow channels and from the temporary resin flow channels into the preform, impregnating the preform with the resin, stopping the flow of the resin, removing the temporary resin flow channels, by returning the flexible impermeable membrane to a position flush with the surface of the preform, curing the resin in the preform and forming the composite, wherein the flexible impermeable membrane comprises an inflatable bubble mat, and wherein deforming the flexible impermeable membrane into temporary resin flow channels comprises inflating bubbles in the bubble mat thereby causing the bubble mat to move away from the surface of the preform and thereby creating temporary resin flow channels in gaps between the bubbles, and returning the flexible impermeable membrane to a position flush with the surface of the preform comprises deflating the bubbles in the bubble mat.

8. A method of molding a composite by flowing resin into a permeable preform contained in a mold comprising creating temporary resin flow channels on a surface of the preform, drawing a vacuum on the preform prior to flowing the resin into the preform, flowing the resin along the temporary resin flow channels and from the temporary resin flow channels into the preform, impregnating the preform with the resin, stopping the flow of the resin, removing the temporary resin flow channels, curing the resin in the preform and forming the composite, wherein portions of the mold comprise a flexible mold material, said flexible mold material forming a network of internal channels, and further comprising a means for adjusting a pressure inside the network of internal channels, and creating the temporary resin flow channels comprises establishing a differential pressure between the preform and the internal channels, said differential pressure causing the flexible mold material to deform and thereby create the temporary resin flow channels when a localized pressure in the preform exceeds the pressure inside the network of internal channels, and removing the temporary resin flow channels comprises reversing the differential pressure between the preform and the internal channels, the reversed differential pressure causing the flexible mold material to return to a position flush with the surface of the preform.

9. A method of molding a composite by flowing a resin into a preform comprising:
  a. providing a mold surface;
  b. placing said preform on said mold surface;
  c. placing a first flexible impermeable membrane over said preform, said first impermeable membrane having a preform side adjacent said preform;
  d. placing a spacer system on said first flexible impermeable membrane, said first flexible impermeable membrane having a spacer system side adjacent said spacer system;
  e. placing a second flexible impermeable membrane over said spacer system;
  f. drawing a vacuum on said preform;
  g. providing a source of said resin in communication with said preform side of said first flexible impermeable membrane;
  h. applying a resin pressure on said preform side of said first flexible impermeable membrane that is higher than a spacer system pressure on said spacer system side of said first flexible impermeable membrane thereby creating a differential pressure that deforms said first flexible impermeable membrane into a network of gaps in said spacer system, said first flexible impermeable membrane forming temporary resin flow pathways on said preform while deformed into said network of gaps;
  i. flowing said resin along said temporary resin flow pathways and from said resin flow pathways into said preform; then
  j. reversing said differential pressure thereby causing said first flexible impermeable membrane to press evenly upon said preform to remove said temporary resin flow pathways; then
  k. curing said resin in said preform to form said composite.

10. The method of claim 9, wherein creating said differential pressure comprises applying a vacuum to said spacer system and reversing said differential pressure comprises applying atmospheric pressure to said spacer system.

11. The method of claim 10, wherein said source of said resin is substantially at atmospheric pressure.

12. The method of claim 9, wherein said spacer system comprises a link mat.

13. The method of claim 9, wherein said spacer system comprises a bubble mat.

14. The method of claim 9, wherein said spacer system comprises an inflatable bubble mat.

15. The method of claim 9, wherein said spacer system comprises a fabric mat.

16. The method of claim 9, wherein said spacer system comprises a flexible sheet with a network of gaps.

17. The method of claim 10, wherein said spacer system comprises a flexible sheet with a network of gaps.

18. The method of claim 11, wherein said spacer system comprises a flexible sheet with a network of gaps.

19. A method of molding a composite by flowing a resin into a preform comprising:
  a. providing a mold surface;
  b. placing said preform on said mold surface;
  c. placing an inflatable bubble mat over said perform, said inflatable bubble mat having a preform side adjacent said preform;
  d. drawing a vacuum on said preform;
  e. providing a source of said resin in communication with said preform side of said inflatable bubble mat;
  f. inflating said bubble mat thereby causing said bubble mat to move away from said preform and thereby creating temporary resin flow pathways in gaps on said preform side of said bubble mat;
  g. flowing said resin along said temporary resin flow pathways and from said temporary resin flow pathways into said preform; then
  h. deflating said bubble mat thereby returning said bubble mat to a position flush with said preform to remove said temporary resin flow pathways; then
  i. curing said resin in said preform to form said composite.

* * * * *

UNITED STATES PATENT AND TRADEMARK OFFICE
CERTIFICATE OF CORRECTION

PATENT NO. : 6,406,659 B1
DATED : June 18, 2002
INVENTOR(S) : Lang et al.

It is certified that error appears in the above-identified patent and that said Letters Patent is hereby corrected as shown below:

<u>Column 2,</u>
Line 55, change "yams" to -- yarns --.

Signed and Sealed this

Nineteenth Day of November, 2002

Attest:

Attesting Officer

JAMES E. ROGAN
*Director of the United States Patent and Trademark Office*